US005764346A

United States Patent [19]

Jard et al.

[11] Patent Number: 5,764,346

[45] Date of Patent: Jun. 9, 1998

[54] APPARATUS FOR HANDLING VALUE SHEETS

[75] Inventors: Philippe Jard, Downingtown, Pa.; Andre Gerlier, Sciez, France

[73] Assignee: Mars Incorporated, McLean, Va.

[21] Appl. No.: 649,665

[22] PCT Filed: Sep. 29, 1995

[86] PCT No.: PCT/IB95/00865

§ 371 Date: May 29, 1996

§ 102(e) Date: May 29, 1996

[87] PCT Pub. No.: WO96/10808

PCT Pub. Date: Apr. 11, 1996

[30] Foreign Application Priority Data

Sep. 29, 1994 [GB] United Kingdom .................. 9419694

[51] Int. Cl.$^{6}$ ...................................................... G06K 9/74

[52] U.S. Cl. ........................................ 356/71; 271/258.01

[58] Field of Search ......................... 356/71; 250/223 R, 250/574, 575, 239, 556; 382/7, 17, 18; 364/405, 401, 478, 507, 508, 516, 550; 271/256, 258, 259; 34/143, 146, 215, 216, 388, 402, 403, 405, 572; 198/743, 468.9, 468.11, 717, 736, 737, 738, 741, 747

[56] References Cited

U.S. PATENT DOCUMENTS

| | | | |
|---|---|---|---|
| 4,114,804 | 9/1978 | Jones et al. | 235/476 |
| 4,406,996 | 9/1983 | Oka | 340/674 |
| 4,457,656 | 7/1984 | Kosina et al. | 414/31 |
| 4,559,452 | 12/1985 | Igaki et al. | 250/563 |
| 4,587,434 | 5/1986 | Roes et al. | 250/556 |
| 4,618,257 | 10/1986 | Bayne et al. | 356/71 |
| 4,769,532 | 9/1988 | Kawakami | 250/205 |
| 4,782,225 | 11/1988 | Hirose et al. | 250/223 |
| 4,931,963 | 6/1990 | Kimura et al. | 364/551.01 |
| 4,947,441 | 8/1990 | Hara et al. | 382/7 |
| 5,027,415 | 6/1991 | Hara et al. | 382/7 |
| 5,034,616 | 7/1991 | Bercovitz | 250/550 |
| 5,040,665 | 8/1991 | Suzuki | 198/743 |
| 5,182,722 | 1/1993 | Hain | 364/551 |
| 5,199,543 | 4/1993 | Kamagami et al. | 194/207 |
| 5,255,907 | 10/1993 | Orlandini | 271/277 |
| 5,351,834 | 10/1994 | Duss | 209/576 |
| 5,444,616 | 8/1995 | Nair et al. | 364/405 |
| 5,581,907 | 12/1996 | Kuma et al. | 34/572 |

FOREIGN PATENT DOCUMENTS

| | | |
|---|---|---|
| 0 440 137 A2 | 7/1991 | European Pat. Off. . |
| 0 559 615 | 9/1993 | European Pat. Off. . |
| 59-69342 | 4/1984 | Japan . |
| 59-69343 | 4/1984 | Japan . |
| 59-69344 | 4/1984 | Japan . |
| 1 384 501 | 2/1975 | United Kingdom . |
| 1 442 485 | 7/1976 | United Kingdom . |
| 1 470 737 | 4/1977 | United Kingdom . |
| 2 107 911 | 5/1983 | United Kingdom . |
| WO 93 23824 A | 5/1993 | WIPO . |
| WO 94 16413 A | 12/1993 | WIPO . |

*Primary Examiner*—Georgia Y. Epps
*Assistant Examiner*—Michael P. Stafira
*Attorney, Agent, or Firm*—Fish & Richardson P.C.

[57] ABSTRACT

Test apparatus for value sheets (e.g. currency notes) comprises optical sensors (16; 116), a path along which the sheet is transported past the sensors, and reference devices (46, 146) carrying reference surfaces (48; 148) having predetermined optical characteristics, for example, for calibration of the optical sensor. Each reference device is rotatable to facilitate rapid movement of the sheet past the optical sensors. The transportation path may be defined by entry and exit guides. Alternatively it may be defined by upper and lower guides (20, 22) of spaced apart wires (24, 32) which do not substantially obscure the surfaces of sheet or the reference surfaces, from the optical sensors. Guide rollers (54, 58, 154, 158) project through spaces between the wires to advance the sheet. An automatic cleaning device is operable to clean the reference surfaces.

28 Claims, 6 Drawing Sheets

APPARATUS FOR HANDLING VALUE SHEETS

BACKGROUND OF THE INVENTION

This invention relates to apparatus for handling value sheets. The term value sheets is intended to denote banknotes, bonds, credit cards, bank cards, tickets, identity cards, entrance cards and the like. In one form, the invention is concerned with apparatus for handling such sheets so that the sheets can be tested by an optical sensor for identifying and/or authenticating such sheets.

GB1470737 describes a value sheet tester which employs an optical colour sensor. In order to compensate for the effects of aging and drift which may cause inconsistent results over a long period of time, reference measurements are made by the optical sensor using a reverence device, and the results are used for re-calibration.

Based on the above principle, a known bank note tester has a built-in reference surface which is fixed at a position to face the optical sensor across the path of bank notes. When a bank note is transported past the sensor, the note obscures the reference surface such that the surface of the note is sensed. In the absence of a bank note, the reference surface is exposed, and reference measurements can be made by the optical sensor to verify its calibration, and to effect re-calibration if necessary.

In order to achieve accurate results from the optical sensor, it is important that the notes are fed past the sensor at a predetermines distance corresponding to the predetermined focusing distance of the optical sensor. Similarly, in order to achieve accurate results from the reference surface, the reference surface is aced immediately adjacent the path of the notes such that, in the absence of bank notes, the reference surface will be approximately at the correct focusing distance from the optical sensor. In fact, the notes contact the reference surface as the notes are transported past the optical sensor.

If the mechanism handles notes at only a low rate, each note will be transported past the optical sensor and the reference surface at a relatively low speed, and the above arrangement is quite satisfactory. However, if a higher handling rate is desired, then the notes have to be transported past the optical read at a correspondingly higher speed.

With the above arrangement, the bank notes fed at such a higher speed may be prone to jamming because the notes have to be transported at high speed past the reference surface, and contact with the reference surface is generally required to ensure that the bank notes are at the correct distance from the optical sensor.

Furthermore, regular cleaning of the reference surface is required to ensure that the surface is not dirty when reference measurements are taken. Any dirt on the reference surface may cause inappropriate reference measurements to be made, which could upset the calibration of the optical sensor, and lead to a loss of accuracy of the validator. Typically, cleaning is carried out every three months. The conventional way to clean the reference surface is to insert a cleaning sheet into the mechanism as a dummy banknote such that it is drawn pas the reference surface. The sheet may be wetted with a solvent to clean the surface. If this does not remove the dirt, then the mechanism has to be opened to gain access to the reference surface, and the surface cleaned manually. Such an operation is both time consuming and relatively expensive if it has to be carried out by an authorised technician. Further, the mechanism can not be used while the cleaning operation is being carried out.

Reference is made to U.S. Pat. No. 5,199,543 which describes a bill discriminating device which uses sensor circuitry for scanning and reading the printed patterns of a bill, and producing data representing the density of the printed patterns. A carrier roller is disposed under the sensor for transporting the bill. The roller has a black or blackish periphery for keeping the reflectance of light to a minimum. The data read by the sensor consists of "useless" data representing the black carrier roller, and data representing the tone of the printed bill. The circuitry discriminates an edge of the bill according to the data.

Reference is also made to EP-A-0559615 which describes a transport cylinder for carrying sheets past a sensor. A clip on the cylinder grips the leading edge of the sheet, and a calibration plate guides the sheet against the cylinder as the sheet approaches the sensor. A mechanism moves the plate away from the cylinder intermittently to enable the clip to pass under the plate.

SUMMARY OF THE INVENTION

In a first aspect, the invention provides value sheet testing apparatus comprising an optical sensor, a path along which a value sheet is transported past the optical sensor for testing by the optical sensor, a reference device adjacent to the path an bearing a reference surface, the reference device being movable, in use, to present different portions of the reference surface to the optical sensor so as to facilitate the movement of the value sheet.

In a related aspect the invention provides value sheet testing apparatus comprising an optical sensor, a path along which a value sheet is transported past the optical sensor for sensing by the optical sensor, and a reference device adjacent to the path and bearing a reference surface which can be sensed by the optical sensor, wherein the reference device is movable such that, in use, at least a portion of the reference surface adjacent to a said value sheet moving in said path moves generally in the same direction as the direction of travel of the value sheet in the path.

Such arrangements can avoid the reference surface hindering the transportation of a value sheet, such as a currency note, at high speed. A value sheet can be fed into contact with the reference surface, to ensure that the sheet is at the correct focusing distance from the optical sensor, without substantial risk of the value sheet being jammed or being damaged by frictional contact with the reference surface.

The term reference surface is used herein to mean a surface having predetermined optical characteristics. Such optical characteristics may be in the form of a surface of substantially uniform colour, for example, white, to provide a colour reference which can be sensed by the optical sensor. Such a reference surface may be used for calibration in the absence of a value sheet, as described above. Additionally, or alternatively, the reference surface may provide a background or surround reference during the sensing of a value sheet, which can be used, for example, to normalise the output from the sensor, or to enable one or more edges or other characteristics of the note to be identifiable more clearly. The reference surface could also, or alternatively, carry a predetermined optical pattern which can be sensed to provide information about the reference surface, such as its relative position (i.e. angular orientation in the case of a drum surface), reference dimensions and speed of movement.

The reference surface may have a number of differently coloured regions to provide a multi-colour reference test for the optical sensor. During the testing, each region may, for example, be presented individually to the optical sensor for a specific colour test.

Preferably, the reference surface is used for calibrating the optical sensor. In the preferred embodiment, an electric circuit is operable to calibrate the output of the optical sensor in the absence of any value sheet adjacent to the sensor.

Preferably, a least a region of the reference surface is coloured a light colour, so as to reflect light, so that the reflected light can be detected by the optical sensor. In the preferred embodiment, the reference surface is coloured white to provide a white reference colour for the optical sensor.

Preferably, the optical sensor is focused at a distance corresponding generally to the separation of the reference surface an the optical sensor. With such an arrangement, the optical sensor can detect the optical characteristics of the reference surface accurately. Also, a value sheet in contact with the reference surface in the sheet oath will automatically be guided at the correct focusing distance from the optical sensor to ensure that the note is in correct focus for the optical sensor.

Preferably, the apparatus comprises means for driving the reference device to cause the movement of the reference surface.

Different forms of movable reference device and reference surface are envisaged. However, it is preferred that the reference surface is an endless surface, at least in the direction of movement of the surface.

Preferably, the reference device is mounted at a fixed location in the apparatus, i.e. the reference device does not, in normal operation of the apparatus, move between different physical positions in the apparatus.

Preferably, the reference device comprises at least one rotatable element, such as a disc, or a drum. In the preferred embodiment, the reference surface is an actual surface of the drum.

Preferably, the apparatus comprises means for guiding the value sheets at least into partial contact with the reference surface, to ensure that the value sheets are accurately spaced from the optical sensor as they are transported therepast. Preferably, such means constrain the value sheet in contact with, or immediately adjacent to, the part of the reference surface facing towards the optical sensor. Such means may include a guide or grille screen of narrow, spaced apart elements, such as wires or other filaments. Preferably, the elements are sufficiently narrow, and are sufficiently widely spaced, that they can extend over the region of the reference surface facing the optical sensor without obscuring substantially the reference surface and/or the value sheet being sensed. In one preferred embodiment, two guides of such elements are used to define the transportation path of value sheets past the optical sensor. The wires of the two screens are preferably arranged in register so as not to increase the area of the reference surface which is obscured by the elements.

Two optical sensors may be provided, one for sensing a first face of a value sheet, and the other for sensing the opposite face of the value sheet. In such a case, the two sensors may be arranged one downstream of the other in the path of the value sheet. Each sensor may have an associated movable reference device bearing a reference surface, as described above.

In a third aspect, the invention provides apparatus for guiding a value sheet, wherein a guide is used to define a least partly a transportation path along which a note can be moved in face alignment with the guide, the guide comprising a plurality of spaced filaments. In this context, the term filament is intended to include slender elements such as wires, cords, narrow bars and spoke-like elements. The filaments may be relatively rigid, or they may be capable of flexing. Preferably, the filaments are not inherently rigid, they are mounted in a manner in which the filaments are pulled taught, to form the guide. The portion of the filaments which may contact the value sheet should preferably be smooth, to avoid undesirable frictional contact with the value sheet.

The guide can thus provide a barrier or screen in the form of a grille consisting of the filaments, which defines a "wall" of the transportation path.

With such an arrangement, the possible area of contact between the filaments and the value sheet can be relatively small, such that a value sheet can be advanced along the guide at high speed without a problem of frictional contact with the filaments being likely to cause a jam or to cause damage to the note.

The filaments may each have any desired cross-sectional shape, for example, round, rectangular, oval, triangular. However, the region of each filament facing towards the path of a value sheet is preferably tapered, or curved, to some extent to reduce further the contact area with a value sheet. Preferably, this region of each filament is rounded, to avoid having a sharp edge which could damage the surface of a value sheet, particularly if the sheet is to be transported at relatively high speed along the path.

The spacing of the filaments can allow additional parts of the apparatus to interact with a value sheet being transported in the path. For example, one or more drive rollers or presser rollers may project between the filaments to drive the value sheet along the transportation path. A recess or space would need to be provided in which each filament would be received; such a recess may be provided as a circumferential groove on the surface of a roller drum. Also, the visual pattern on the face of the value sheet may be visible through the spacing between the filaments, so that an optical sensor can be used to sense the value sheet. In such a case, the number of filaments, and the size of each filament, are preferably selected so that the filaments do not obstruct substantially the area of the face of the note to be sensed.

The particular arrangement of the filaments in the guide may be selected as desired. Preferably, at least some of the filaments extend generally longitudinally, i.e. parallel with the direction of travel of a value sheet in the transportation path. This can reduce the possibility of a raised edge of a value sheet being caught by a filament, which might damage the value sheet or cause a jam. A grid arrangement is also envisaged, for example, consisting longitudinal an transverse filaments.

In a preferred arrangement, two guides of filaments are provided to define the transportation path. The guides are generally parallel with each other, and define a narrow space therebetween which is the transportation path for the value sheet. Such an arrangement can permit a value sheet to be transported at high speed along the path even though the guides themselves may be stationary.

In a fourth aspect, the invention provides value sheet testing apparatus comprising an optical sensor, a path along which a value sheet is transported past the optical sensor for testing by the optical sensor, a reference device adjacent to the path and bearing a reference surface and means operable to clean the reference surface.

Preferably, the means for cleaning comprises means selectively operable to perform the cleaning operation. In the preferred embodiment, the means for cleaning comprises means for bringing a cleaning surface into contact with the reference surface, the reference surface being moved relative to the cleaning surface by movement of the reference device. For example, the reference device may be a rotating drum. The means for cleaning may comprise a reservoir for holding cleaning fluid, for example, detergent, a conduit for feeding cleaning fluid from the reservoir to a cleaning pad, and means for selectively moving the pad between a position in which it contacts the reference surface, and a retracted or stowed position. In the stowed position, the surface of the pad is preferably covered to prevent evaporation of the cleaning fluid. The pad is preferably pivotally movable between the two positions.

In a closely related further aspect, the invention also provides value sheet testing apparatus comprising an optical sensor, a path along which a value sheet is transported past the optical sensor for testing by the optical sensor, a reference device adjacent to the path and bearing an optical reference surface, the reference device being movable, in use, to present different portions of the reference surface to the optical sensor.

With such an arrangement, test measurements of the reference surface by the optical sensor can be made over a number of different portions of the reference surface. This can be used to enable more versatile calibration and testing of the optical sensor. For example, the measurements from different regions can be averaged.

The above aspects of the invention may be used independently of each other, but are preferably used in combination to provide the full advantages of the invention.

BRIEF DESCRIPTION OF THE DRAWINGS

Embodiments of the invention are now described with reference to the accompanying drawings, in which.

DESCRIPTION OF THE PREFERRED EMBODIMENTS

Figure 1:
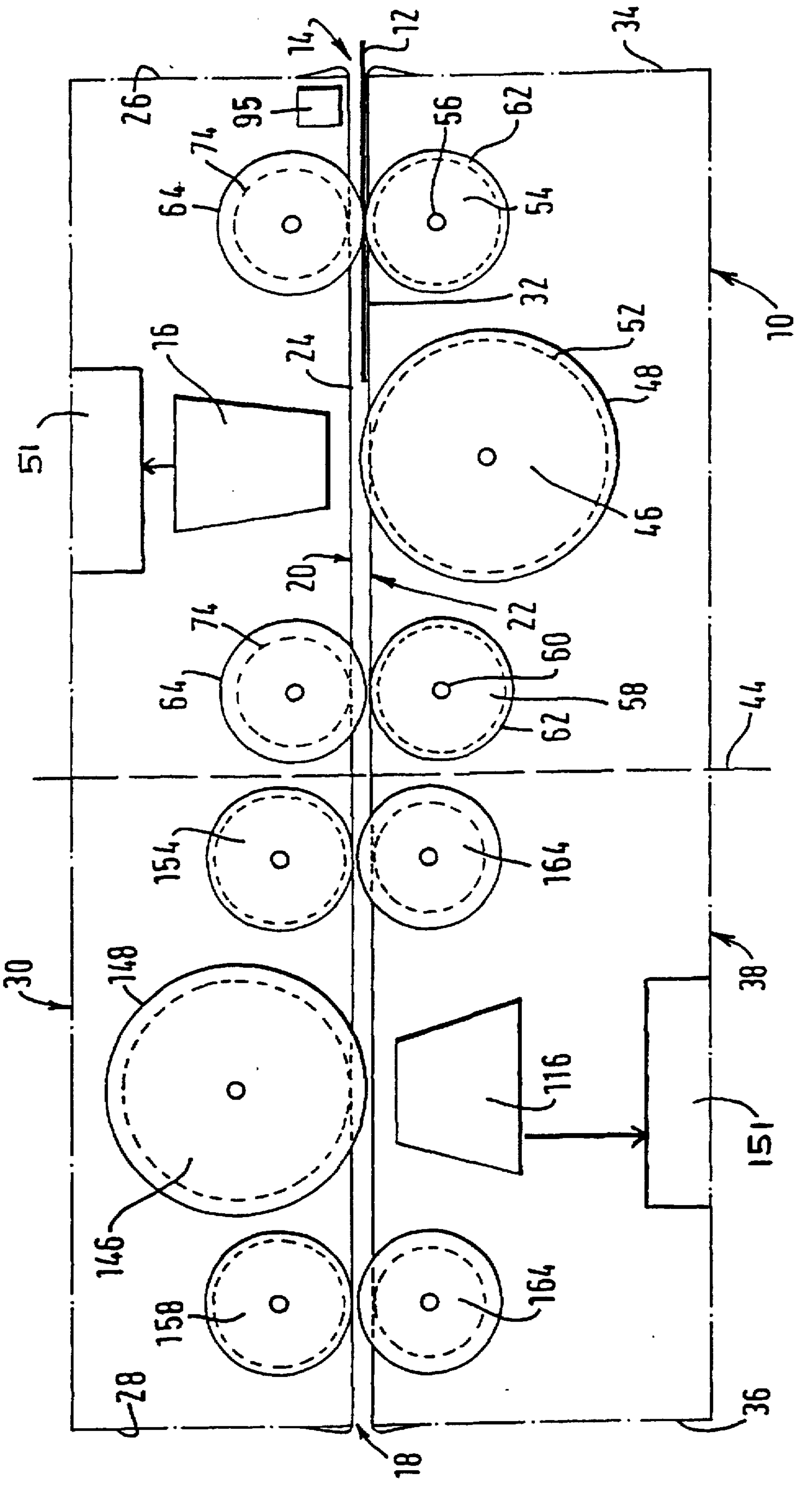
FIG. 1 is a schematic sectional view through a transportation mechanism for a currency note validator.

Referring to FIGS. 1 to 4, a transport mechanism 10 for a currency note validator (not shown) receives an inserted currency note 12 from an entry area 14, and transports the note 12 past a first optical sensor 16 for sensing the upper surface of the note, and past a second optical sensor 116 for sensing the lower surface of the note, to an exit area 18. It will be appreciated that the entry area 14 might be preceded by another handling mechanism, and the exit area 18 might be followed by a further mechanism. However, the present description concentrates on the mechanism for transporting the currency note past the optical heads 16 and 116, and such further mechanisms are not described specifically herein.

Figure 3:
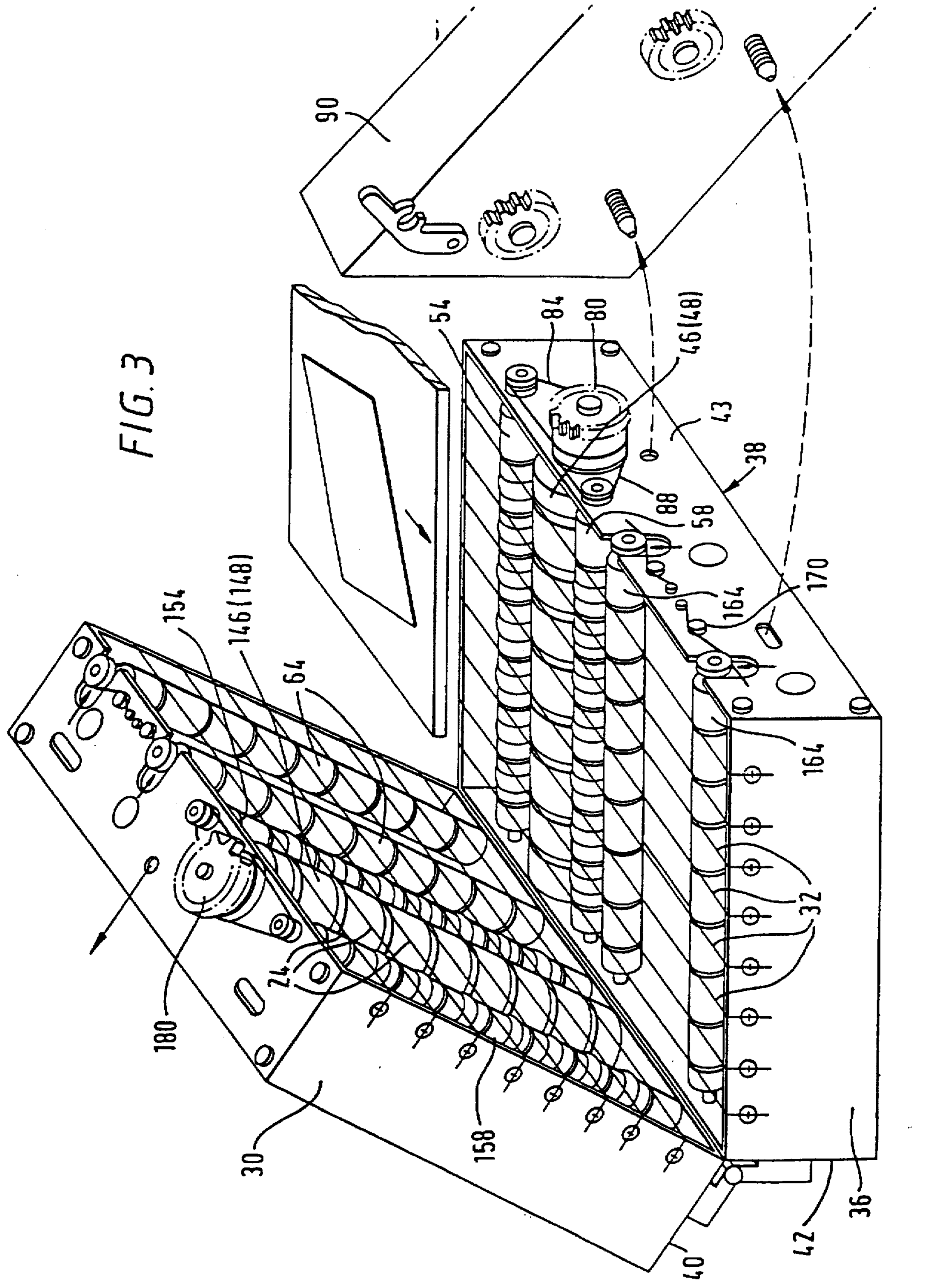
FIG. 3 is a schematic perspective view of the mechanism in a hinged open condition.
Figure 4:
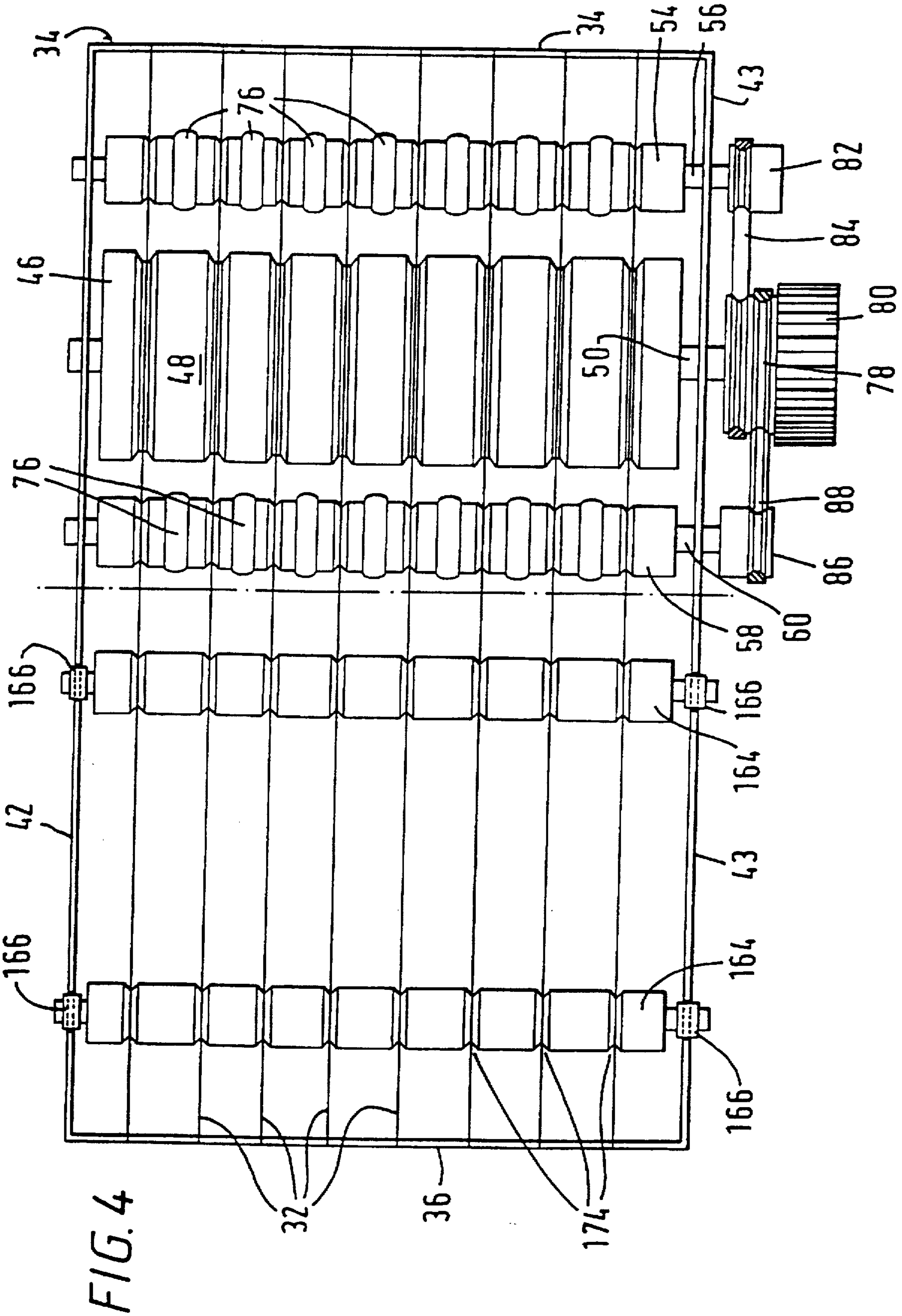
FIG. 4 is a plan view of the lower half of the mechanism.

The transportation path of the note 12 from the entry area 14 to the exit area 18 is defined by upper and lower wire guides or screens 20 and 22, respectively. The upper screen 20 consists of a number of spaced apart wires 24 secured at their opposite ends to the front and rear walls 26 and 28, respectively, of an upper support frame 30 by stable fixings. In this exemplary embodiment, the wires 24 are generally parallel with each other, and extend generally parallel to the direction of travel of a note 12. The wires may be made of metal, or of other sufficiently strong material, such as carbon fibre. The lower screen 22 is similarly formed of wires 32 which are fixed to the front and rear walls 34 and 36, respectively, of a lower support frame 38. As can be seen in FIG. 3, the upper and lower support frames 30 and 38 are hinged together along mutual side walls 40 and 42 to allow access to the path of a note 12 if required, for example, for maintenance or in order to release a note if the note becomes trapped.

In this exemplary embodiment, the mechanism 10 may conveniently be described further in two sections which are divided by the broken line 44 (FIG. 1). The section to the right of the broken line 44 is associated with the first optical sensor 16, and the section to the left of the broken line 44 is associated with the second optical sensor 116.

The first optical sensor 16 is mounted in the upper frame 30. A first generally cylindrical reference drum 46 bearing a reference surface 48 is mounted on a rotatable axle 50 which is supported in bearings (not shown) in the side walls 42 and 43 of the lower frame 38. The drum 46 is dimensioned such that the cylindrical surface projects slightly above the level of the wires 32 of the lower support screen 22, and circumferential grooves 52 are formed in the surface of the drum for receiving the wires 32 without direct contact therewith. One function of the reference surface 48 is to provide the optical sensor with a colour reference (for example, a white surface) to enable the optical sensor and its associated electronics to be re-calibrated periodically to compensate for the effects of inherent drift and age over a long period of time. In this embodiment, the reference surface 48 is coloured white, and the drum 46 is made of white thermoplastics material which does not discolour with age. An electronic circuit (shown schematically at 51) is provided for calibrating the output of the optical sensor. Such a circuit is known in the art, and so is not described further herein.

As seen in FIG. 1, a first guide roller 54 mounted on a guide roller axle 56 is positioned to the right of the drum 46, and a second guide roller 58 mounted on a guide roller axle 60 is positioned to the left of the drum 46. The guide roller axles 56 and 60 are rotatably mounted in bearings (not shown) in the side walls 42 and 43 of the lower frame 38. The guide rollers 54 and 58 are positioned such that their uppermost surfaces are approximately flush with the wires 32 of the lower support screen 22, and circumferential grooves 62 (similar to the grooves 52 in the drum 46) are formed in the guide rollers 54 and 58 for receiving the wires 22 without direct contact therewith.

A pair of presser rollers 64 are mounted on presser roller axles (not shown) which are rotatably mounted in bearings 66. The bearings 66 are received in slots 68 in the side walls 40 and 41 of the upper frame 30 to enable the presser rollers to be capable of limited vertical movement. A respective spring 70 bears against each bearing 66 to urge the being downwardly, such that the presser rollers 64 are pressed into engagement with the guide rollers 54 and 58. Each spring 70 is mounted on a respective stud 72 and has one arm 70*a* engaging the bearing 66, and another arm 70*b* received in an anchoring opening. Circumferential grooves 74 are formed in the surface of each presser roller 64 for receiving the wires 24 of the upper screen 20 without direct contact therewith. The grooves 74 are similar to the grooves 62 in the guide rollers 54 and 58, but are deeper than those grooves 62 to permit the presser rollers 64 to project through the wires 24 of the utter screen 20 to press on the surfaces of the guide rollers 54 and 58, which are generally flush with the wires 32 of the lower screen 22. To improve the grip between the presser rollers 64 and the guide rollers 54 an 58, tires 76 of elastomeric material are fitted to the guide rollers 54 and 58 at positions between the wires 24 of the lower screen 22. The tires are located in circumferential grooves (not shown) similar to the grooves 62 described above.

Figure 2:
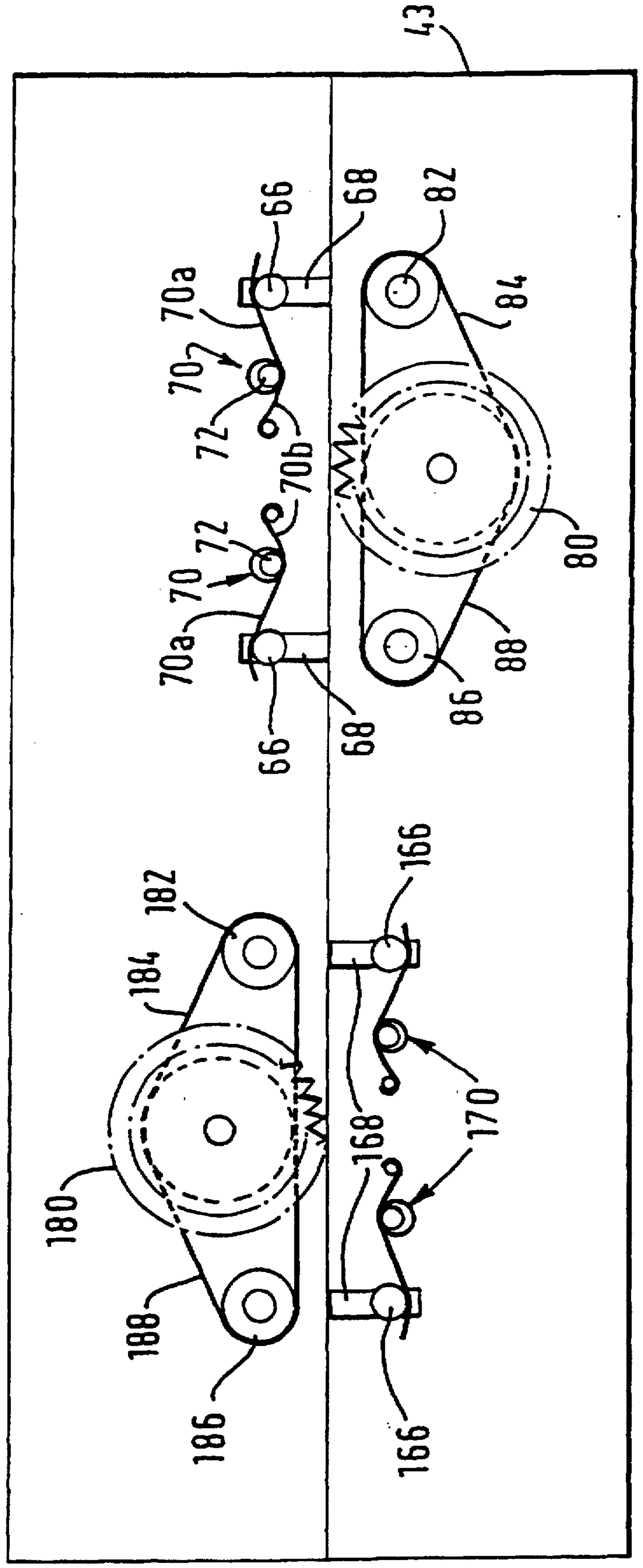
FIG. 2 is a side view of the mechanism showing a part of the drive arrangement.

As best seen in FIGS. 2 and 3, the end of the drum axle 50 projecting through the side wall 43 of the lower frame is fitted with a dual pulley 78 and with a toothed drive gear 80. The end of the first guide roller axle 56 projecting through the side wall 43 is fitted with a pulley 82 which is coupled by a drive belt 84 to one of the channels of the dual pulley 78. The end of the second guide roller axle 60 projecting through the side wall 43 is fitted with a pulley 86 similar to the pulley 82, and is coupled by a drive belt 88 to the other channel of the dual pulley 78. In this exemplary embodiment, the pulleys are dimensioned such that the guide rollers 54 and 58 driven from the drum axle by the belts 84 and 88 will have the same peripheral speed as the drum 46.

Corresponding elements to those discussed above are also provided for the second optical sensor. These elements are illustrated to the left so the broken line 44 in FIG. 1, and are denoted by the same reference numerals used above, but preceded by the number 100. However, in view of the fact that the second optical sensor is positioned in the lower frame instead of in the upper frame, the positions of the second reference drum 146, the guide rollers 154 and 158, and the presser rollers 164 are reversed between the under and lower frames. In particular, the second reference drum 146 projects slightly below the level of the wires 24 of the upper screen 20, and the presser rollers 104 are biased upwardly to project through the wires 32 of the lower screen 22 to engage the guide rollers 154 and 158.

A drive unit 90 (FIG. 3) containing an electric motor (not shown) is coupled to the drive gears 80 and 180 to rotate the first and second drums 46 and 146, respectively, and thus drive also the guide rollers 54, 58, 154 and 158.

In use, in the absence of a currency note 12, the reference surfaces 48 and 148 can be sensed by the optical sensors 16 and 116, as described above, for re-calibration. The wires 24 and 32 do not obstruct substantially the reference surfaces 16 and 116. The small regions covered by the wires 24 and 32 will not be able to be sensed, but these regions are very small and do not detract from the overall calibration.

When a note 12 is received between the upper and lower screens 20 and 22, respectively, from the entry area 14, the note 12 is advanced over the first reference surface 48, and over the second reference surface 148. The note 12 is engaged progressively by the guide rollers 54, 58 and the presser rollers 64 associated with the first optical sensor 16, and by the guide rollers 154, 158 and the presser rollers 164 associated with the second optical sensor 116. The note 12 is transported by the guide rollers, the note 12 being pressed into engagement with the guide rollers by the corresponding presser rollers 64 and 164. As best seen in FIG. 1, the surfaces of the reference drums 46 and 146 project further between the wire screens than their associated guide rollers 54, 58 and 154, 156, respectively. This means that the note is diverted slightly from a straight line path by the reference drums 46 and 146. The note 12 is thus pressed against the respective reference surfaces 48 and 148, to ensure that the note 12 is positioned at the correct focusing distance from the optical sensors 16 and 116. The rotation of the reference drums 46 and 146, and the corresponding movement of their reference surfaces 48 and 148, respectively, ensures that each reference surface does not hinder the movement of the note as would, for example, a conventional stationary reference surface, and the note 12 can be transported at high speed without risk of jamming the mechanism, or of damage to the note 12.

A charge-coupled-device (c.c.d.) array 95 is mounted over the transportation path near the entry area 14 to detect the presence of a sheet 12 being inserted into the apparatus, and to detect the orientation or alignment so the sheet as it moves past the c.c.d. array 95, that is to say, to detect whether the note is parallel with the longitudinal direction of the path, or whether it lies at an angle relative to the longitudinal direction. The c.c.d. array 95 can also provide information about the transverse position of the sheet, and about any physical defects such as holes in the sheet, or uneven edges, which might otherwise cause confusing results when sensed by the optical sensors 16 and 116.

The wire screens 20 and 22 guide the note 12 to ensure that the note 12 is passed in the correct manner through the pairs of guide rollers 54, 58, 154 and 158 and their associated presser rollers 64, 164, and over the reference drums 46 and 146. The wires 24 and 32 do not obstruct substantially the faces of the note 12, and this allows the optical sensors 16 and 116 to test accurately the visual pattern on each face of the note. The wires 24 and 32 have relatively smooth surfaces to avoid undesirable frictional engagement with a note. Additionally, the curved profile of each of the wires 24, 32 ensures that the area of any contact between the wire and a note 12 is relatively small.

In this exemplary embodiment which is adapted for currency notes 12, the wires are of about 0.2–0.3 mm in diameter, and are made of metal. The spacing of the wires in each screen is about 6 mm, and the spacing between the screens is about 1.5 mm. The closest distance between each reference roller 46, 146 and the wire 32, 24 of the opposite screen 22, 20, respectively, is about 0.2–0.3 mm. It will be appreciated that, in general, the various dimensions can be adjusted to suit any particular application for testing value sheets, without departing from the principles of the invention.

In the above embodiment, the screens 20 and 22 consist of wires arranged longitudinally. However, other arrangements of wires or other filaments may be used instead. For example, a grid arrangement may be used.

In the above embodiment, the drums 46 and 146 rotate with the same peripheral speed as the guide rollers 54, 58, 154 and 158. As a modification, the drums 46 and 146 may be arranged to rotate at a slightly faster speed. There would then be a degree of slippage of the drums 46 and 146 against the sheet 12, but this could be beneficial as a simple way of continuously cleaning the reference surface by the contact with the sheet 12. The individual speeds of the rollers and/or of the drums could also differ slightly so as to apply a controlled degree of tension to the sheet as it traverses the optical sensors. This would ensure that the sheet is held flat.

Figure 5:
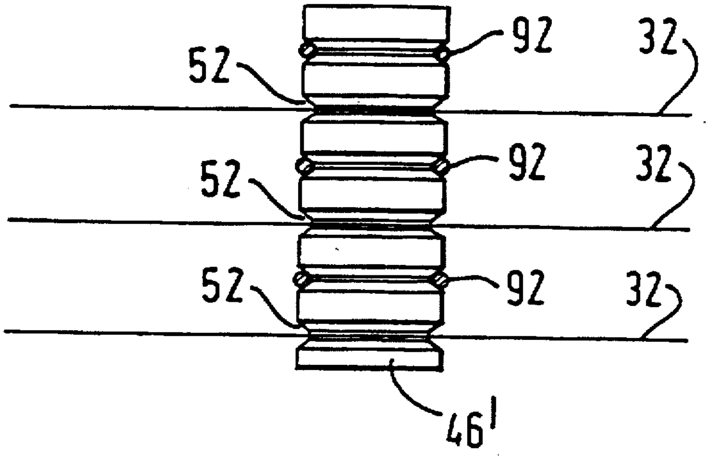
FIG. 5 illustrates a modification for each reference drum.

In the above embodiment, the note is gripped mainly by the guide rollers 54, 58 and, 154, 158 in combination with the respective presser rollers 64 and 164. If more grip is desired for the reference drums 46 and 146 (rotating at the same peripheral speed as the guide rollers, or at relative speeds to apply a controlled tension to the sheet), then a modified drum 46' may be used as shown in FIG. 5. The modified drum 46' is fitted with additional elastomeric tires (o-rings) 92 which sit in circumferential grooves on the surface of the drum 46', in a similar manner to that described above for the tires 76 on the guide rollers. The width of each tire 92 is generally less than that of the tires 76 on the guide rollers, because narrow tires 92 are preferred so as not to cover too large a portion of the reference surface of the drum 46'. As can be seen in FIG. 5, the tires 92 are spaced between the grooves 52 for receiving the wires, so that the tires 92 will not interfere with the wire screens.

Although screens of wires have been described in the above embodiment, other filaments may be used for the screen as desired.

In the embodiments of FIGS. 1 to 5, reverence measurements made using each reference surface 48, 148 may be instantaneous measurements corresponding to small areas or points on the reference surface, or the measurements may be averaged over a certain rotation of the reference surface, for example, a half-rotation or a complete rotation or more. This enables the significance of any dirt or defects of individual points on the reference surface to be "averaged out" to achieve consistent results, which is a substantial advantage over the conventional fixed reference; with a fixed surface, it is not possible to vary the sensed region of the reference surface. Additionally, with the present embodiment, if instantaneous measurements are being taken, and an unexpected measurement occurs owing to dirt or the reference drum, for example, a measurement result falls outside an expected range, then this can be ignored and a fresh measurement taken at a different rotational point of the reference surface.

In the present embodiment, each optical sensor 16, 116 is able to sense an area corresponding to at least the entire area of a face of a sheet, except for the small regions obscured by the wires 24 and 32 of the upper and lower guide screens 20 and 22, respectively. The reference drums 46 and 146 extend across substantially the full sensing width of the optical sensors 16 and 116, respectively, so that the sensors can be calibrated across their entire sensing width. In addition to averaging measurements taken at different rotational positions of the reference drums 46 and 146, measurements taken a different positions along the drums may be averaged.

It will be appreciated that the positions of the guide rollers 54, 58, 154 and 158, the presser rollers 64 and 164, and the reference drums 46 and 146 relative to the screens 20 and 22 may be altered as desired. For example, the degree to which the various elements protect through the screens 20 and 22 may be altered.

As a further modification of the embodiment illustrated in FIGS. 1 to 4, one of the adjacent pairs of guide rollers 58 and 154, and the associated presser roller 64, 164, respectively, may be omitted. This would enable the reverence drums 46 and 146 to be arranged closer together, if desired. However, it is referred that at least one guide roller is provided between the reference drums 46 and 146 in order to maintain a good grip or the sheet 12, so that the orientation of the sheet 12 will not change. A significant advantage of the present apparatus is that a sheet can be transported rapidly past the optical sensors washout any change in the orientation of the sheet relative to the transportation path. It will be appreciated that any alteration of the sheet's orientation may cause inaccurate validation results, because the optical sensors 16 and 116 may then not be sensing the correct areas of surfaces of the sheet.

Figure 6:
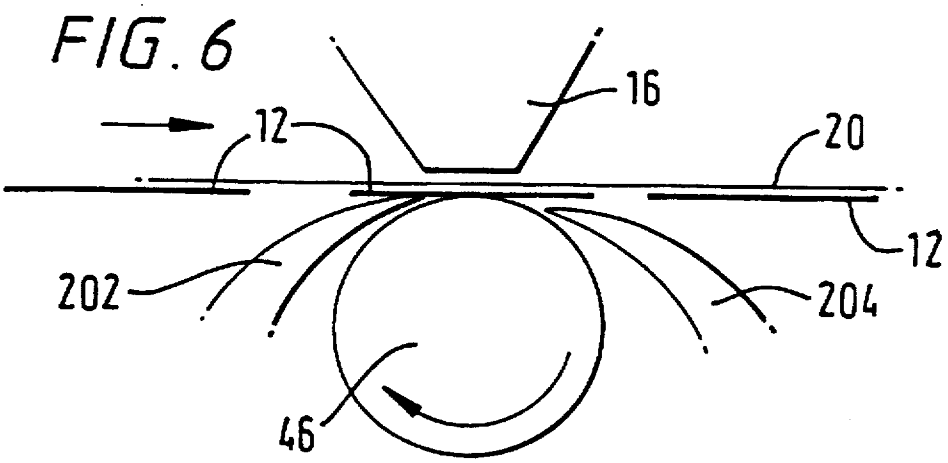
FIGS. 6 and 7 illustrate a modified embodiment with a modified guide.
Figure 7:
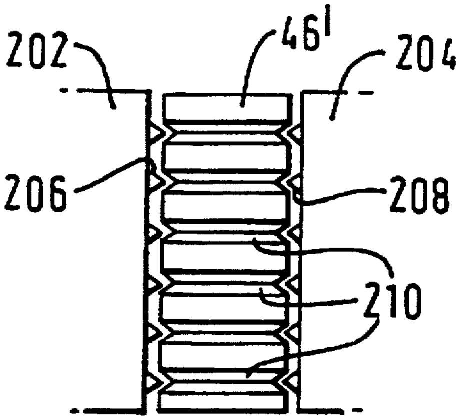

FIGS. 6 and 7 illustrate a modified embodiment. Only a single reference drum 46 and optical sensor 16 are shown for brevity, and the guide rollers 54 and 58 and the presser rollers 64 also are not shown specifically. In FIGS. 6 and 7, the main difference which the modified embodiment has over the above described embodiment is that the lower screen 22 is omitted, and is replaced instead by fixed guide surfaces 202 and 204, which are tapered and angled towards the drum 46. The guide surfaces are arranged adjacent to the reference drum 46, one on the upstream side to feed notes onto the reference drum 46, and the other on the downstream side of the drum 46 to feed notes from the drum 46. The guide surfaces 202, 204 can be spaced from the drum 46 by a small gap, or as a modification (shown in FIG. 7), the guide surfaces 202 and 204 can have toothed edges, 206 and 208, respectively. The teeth would project into circumferential grooves 210 on the surface of the drum 46, similar to the grooves 52 described in the first embodiment.

Figure 8:
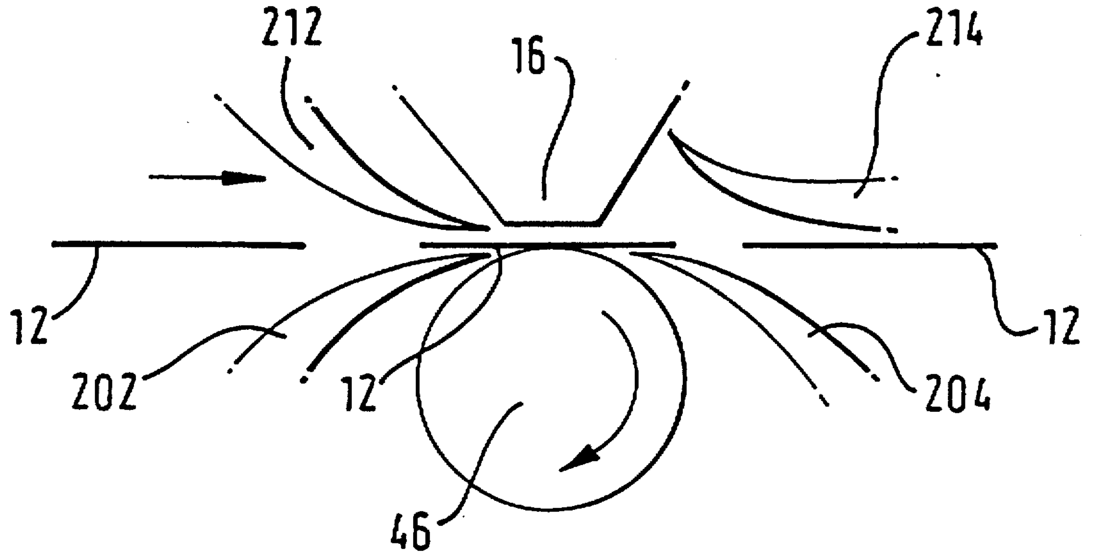
FIG. 8 illustrates a modified embodiment with two modified guides.

FIG. 8 illustrates a second modified embodiment in which both the upper and lower wire screens 20 and 22 of the first embodiment are replaced by fixed guide surfaces. In FIG. 8, the first and second guide surfaces 202 and 204 are as described above. A third guide surface 212 complements the first guide surface 202 to define a narrowing entrance passage for feeding currency notes to the reference drum 46. A fourth guide surface 214 complements the second guide surface 204 to define a narrowing exit passage.

The advantage of using fixed guide surfaces instead of screens of wire is that the guides do not extend across the reference drum and hence do not obscure the reference surface, nor do they obscure the face of a note on the reference surface. On the other hand, the advantage of the wire screens is that they can hold the note across the reference surface, which may provide better positional accuracy for the optical sensor.

Figure 9:
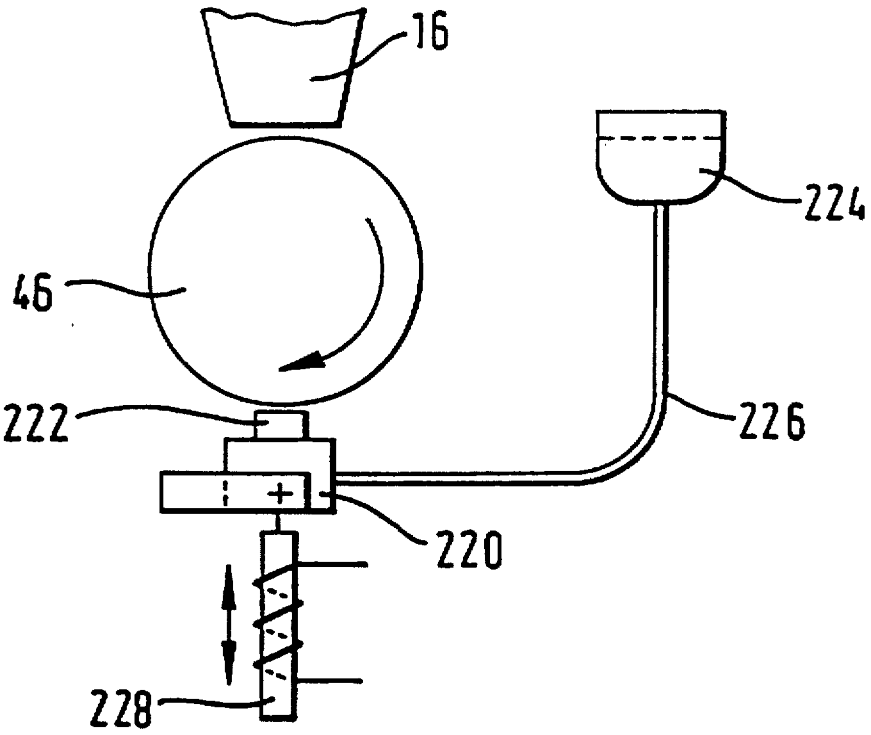
FIG. 9 is a schematic view illustrating a cleaning technique for each reference surface in the mechanism.

FIG. 9 illustrates cleaning apparatus for the reference drum. For brevity, only a single reference drum 46 is illustrated. The cleaning apparatus is arranged on the opposite side of the reference drum 46 to the optical sensor 16, to clean a portion of the reference surface 43 which is not exposed at that instant to the optical sensor 16. The cleaning apparatus consists of a pivoted carriage 220 which carries a cleaning pad 222 of felt. A tank 224 for holding a cleaning fluid, such as a solvent or detergent, is coupled to the carriage 220 by a conduit 226 for supplying cleaning fluid to the pad 222 to wet the pad. The carriage is pivotally movable between an activated position (shown in FIG. 9) in which the pad 222 contacts the reference surface 48 of the drum 46, and a non-activated, or stowed, position, in which the carriage is rotated anti-clockwise through about 90°. In the stowed position, the pad 222 is protected by a cover which prevents evaporation of cleaning fluid from the pad 222.

The carriage 220 is controlled by an actuator 228, which may, for example, be an electromechanical actuator, such as an electromagnetic device (typically a motor or a solenoid), or a pneumatic actuator, which drives the carriage 220 from one position to the other. A return spring (not shown) can be used to return the carriage 220 to its original position.

The cleaning is caused by the rotation of the reference drum 46 relative to the cleaning surface of the pad 222. In a modified cleaning device, for example, for use with a fixed reference surface, an alternative arrangement may be used to bring about relative movement between the pad and the reference surface.

Control means (not shown) determine when a cleaning operation is needed, and operative the cleaning device accordingly. The control means determines when the reference surface is dirty by means of measurements made by the optical sensor 18 of the reference surface 48. If the measurements fall below a predetermined threshold, or outside a certain range, this result is interpreted as being caused by a dirty surface, and the cleaning operation is then started. A laser might be provided in the above embodiment with a fixed reference surface.

In an alternative embodiment, a replaceable cleaning cassette could be used to replace the tank 224 and, for example, the carriage 220.

Although embodiments have been described above for testing currency notes, it will be appreciated that the invention can be used for apparatus for handling value sheets in general.

It will be appreciated that the above description is merely illustrative of preferred forms of the invention, and that modifications may be made without departing from the scope or principles of the invention.

We claim:

1. Value sheet testing apparatus comprising an optical sensor, a path along which a value sheet is transported past said optical sensor for testing by said optical sensor, and a reference device adjacent to said path and bearing a reference surface used for calibrating said optical sensor, wherein said reference device is movable such that, in use, at least a portion of said reference surface adjacent to a said value sheet moving in said path moves generally in the same direction as the direction of travel of said value sheet in said path.

2. Value sheet testing apparatus comprising an optical sensor, a path along which a value sheet is transported past said optical sensor for testing by said optical sensor, and a reference device adjacent to the path and bearing a reference surface having a predetermined optical characteristic and consisting of at least one light coloured region for reflecting light to said optical sensor, wherein said reference device is movable such that, in use, at least a portion of said reference surface adjacent to a said value sheet moving in said path moves generally in the same direction as the direction of travel of said value sheet in said path.

3. Value sheet testing apparatus comprising an optical sensor, a path along which a value sheet is transported past said optical sensor for testing by said optical sensor, a reference device installed adjacent to the optical path and bearing an optical reference surface used for testing said optical sensor, said reference device being movable, in use, to present different portions of said reference surface to said optical sensor.

4. Apparatus according to claim 1, further comprising an electric circuit for effecting a calibration for said optical sensor, based on the output from said optical sensor in the absence of a said value sheet adjacent to said optical sensor such that the output from said optical sensor is responsive to the optical characteristics of said reference surface.

5. Apparatus according to claim 1, wherein said reference surface is coloured white to provide a white reference colour for said optical sensor.

6. Apparatus according to claim 1, further comprising a driver for moving said reference device.

7. Apparatus according to claim 1, wherein said optical sensor is focused substantially at a distance corresponding to the position of said reference surface, such that a sheet engaging said reference surface is at the correct focusing distance with respect to said optical sensor.

8. Apparatus according to claim 1, wherein said reference surface comprises an endless surface in the direction of movement of said surface.

9. Apparatus according to claim 1, wherein said reference device comprises at least one rotatable element.

10. Apparatus according to claim 9, wherein said reference device comprises a rotatable drum.

11. Apparatus according to claim 1, further comprising guide means for guiding said value sheet into at least partial contact with said reference surface as said value sheet is moved past said optical sensor.

12. Apparatus according to claim 11, wherein said guide means comprise one or more fixed guide surfaces.

13. Apparatus according to claim 11, wherein said guide means comprises at least one guide of spaced filaments.

14. Apparatus according to claim 13, wherein said path of a said value sheet is defined by two screens of filaments.

15. Apparatus according to claim 1, further comprising a second optical sensor positioned downstream of said first optical sensor for sensing an opposite face of said value sheet to said first optical sensor, and a second reference device bearing a second reference surface which can be sensed by said second optical sensor, said second reference device being movable in the same manner as said first reference device.

16. Apparatus for transporting a value sheet, comprising a guide defining a transportation path along which a sheet can be moved in face alignment with the guide and transport means for transporting said value sheet relative to said guide, wherein the guide comprises a plurality of spaced filaments, each said filament being fixed between two stationary points.

17. Apparatus for guiding a value sheet, wherein a guide is used to define at least partly a transportation path along which a sheet can be moved in face alignment with said guide, said guide comprising a plurality of spaced filaments, wherein the cross-section of each said filament is tapered in the direction of the path of said value sheet.

18. Apparatus according to claim 17, wherein the cross section of each said filament is rounded on the side facing towards said path of said value sheet.

19. Apparatus according to claim 16, further comprising at least one roller projecting between said filaments, to contact said value sheet in the transportation path.

20. Apparatus according to claim 19, wherein said roller comprises a drive roller for advancing said value sheet along said transportation path.

21. Apparatus according to claim 19, wherein said roller comprises a reference device carrying a reference surface for an optical sensor.

22. Apparatus according to claim 19, wherein said roller comprises recesses for receiving said filaments of said guide.

23. Apparatus according to claim 16, wherein each said filament comprises a wire.

24. Apparatus according to claim 1, further comprising means for cleaning at least a portion of said reference surface.

25. Value sheet testing apparatus comprising an optical sensor, a path along which a value sheet is transported past said optical sensor for testing by said optical sensor, a reference device adjacent to said path and bearing a reference surface and means operable to clean said reference surface wherein said means for cleaning comprises means for bringing a cleaning surface into contact with said reference surface and wherein said reference device is movable to cause movement of said reference surface relative to said cleaning surface.

26. Apparatus according to claim 25, wherein said reference device comprises a rotatable member.

27. Value sheet testing apparatus comprising an optical sensor, a path along which a value sheet is transported past said optical sensor for testing by said optical sensor, a reference device adjacent to the path and bearing a reference surface and means operable to clean said reference surface wherein said means for cleaning comprises means for cleaning a portion of said reference surface not exposed to said optical sensor at said time of cleaning.

28. Apparatus according to claim 1 wherein said reference surface comprises a number of differently coloured regions to provide a multi-colour reference test for said optical sensor.

* * * * *

UNITED STATES PATENT AND TRADEMARK OFFICE
CERTIFICATE OF CORRECTION

PATENT NO. : 5,764,346

DATED : June 9, 1998

INVENTOR(S) : Jard et al.

It is certified that error appears in the above-identified patent and that said Letters Patent is hereby corrected as shown below:

Col. 1, line 33, cancel "aced" and insert --placed--.

Col. 2, line 26, cancel "an" and insert --and--.

Col. 3, line 15, cancel "an" and insert --and--.

Col. 3, line 18, cancel "oath" and insert --path--.

Col. 4, line 6, before "the", insert --if--.

Col. 4, line 51, cancel "consisting longitudinal an" and insert --consisting of longitudinal and--.

Col. 6, line 6, cancel "stable" and insert --suitable--.

Col. 7, line 6, cancel "utter" and insert --upper--.

Col. 7, line 39, cancel "104" and insert --164--.

Col. 7, line 67, cancel "156" and insert --158--.

Col. 9, line 30, cancel "or" and insert --on--.

Col. 9, line 45, cancel "a" and insert --at--.

Col. 9, line 55, cancel "reverence" and insert --reference--.

Col. 9, line 57, cancel "referred" and insert --preferred--.

Col. 9, line 59, cancel "or" and insert --on--.

CERTIFICATE OF CORRECTION

PATENT NO. : 5,764,346

DATED : June 9, 1998

INVENTOR(S) : Jard et al.

It is certified that error appears in the above-identified patent and that said Letters Patent is hereby corrected as shown below:

Col. 9, line 62, cancel "washout" and insert --without--.

Col. 11, line 28, (Claim 1) cancel "the" and insert --said--.

Col. 11, line 39, (Claim 2) cancel "the" and insert --said--.

Col. 11, line 51, (Claim 4) cancel "the" and insert --said--.

Col. 11, line 53, (Claim 4) cancel "the" and insert --said--.

Col. 11, line 54, (Claim 4) cancel "the" and insert --said--.

Col. 11, line 62, (Claim 7) cancel "the" and insert --said--.

Col. 11, line 66, (Claim 8) cancel "the" and insert --said--.

Col. 12, line 37, (Claim 18) cancel "the" and insert --said--.

UNITED STATES PATENT AND TRADEMARK OFFICE
CERTIFICATE OF CORRECTION

PATENT NO. : 5,764,346
DATED : June 9, 1998
INVENTOR(S) : Jard et al.

It is certified that error appears in the above-identified patent and that said Letters Patent is hereby corrected as shown below:

Col. 13, line 4, (Claim 27) cancel "the" and insert --said--.

Signed and Sealed this

Sixteenth Day of February, 1999

Attest:

Attesting Officer

*Acting Commissioner of Patents and Trademarks*